US007156519B2

(12) United States Patent
Mao et al.

(10) Patent No.: US 7,156,519 B2
(45) Date of Patent: Jan. 2, 2007

(54) SYSTEM FOR VISUALIZING IMAGES TO VIEWERS IN MOTION

(75) Inventors: Xiaogang Mao, General van Merlenstraat 1, Eindhoven, Noord Brabant (NL) 5623 GC; Liya Hu, Eindhoven (NL)

(73) Assignee: Xiaogang Mao, Eindhoven (NL)

( * ) Notice: Subject to any disclaimer, the term of this patent is extended or adjusted under 35 U.S.C. 154(b) by 168 days.

(21) Appl. No.: 10/975,048

(22) Filed: Oct. 28, 2004

(65) Prior Publication Data

US 2005/0110960 A1 May 26, 2005

(51) Int. Cl.
*G03B 21/00* (2006.01)
*G03B 21/26* (2006.01)

(52) U.S. Cl. .......................... 353/13; 353/94; 353/122

(58) Field of Classification Search ................ 352/100, 352/132; 353/13, 48, 94, 122, 100; 348/744, 348/836, 837

See application file for complete search history.

(56) References Cited

U.S. PATENT DOCUMENTS 742,632 A * 10/1903 Hadden ...................... 352/100
917,587 A * 4/1909 Good ......................... 352/100
978,854 A * 12/1910 Czerniewski ............... 352/100
2,913,954 A * 11/1959 Morgan ......................... 352/2
3,653,753 A * 4/1972 Mitchell ...................... 352/100
3,694,062 A * 9/1972 Koenig ........................ 352/100
5,108,171 A * 4/1992 Spaulding ................... 352/100
6,016,183 A * 1/2000 Yamamoto .................. 352/100
6,353,468 B1 * 3/2002 Howard et al. ............. 352/100
6,564,486 B1 * 5/2003 Spodek et al. ................ 40/453

* cited by examiner

*Primary Examiner*—Melissa Jan Koval
*Assistant Examiner*—Andrew Kong

(57) ABSTRACT

A system for visualizing one or more images to one or more viewers in motion, comprises:
(a) an extended span of screen;
(b) a sequence of projectors mounted along the screen;
(c) at least one device for receiving a series of images; and
(d) a computer for dividing the frame of each image in the series of images into a number of sub-images and shifting the dividing lines on the frame of each image, frame by frame, according to a function of the moving velocity of the viewers, such that the series of images are split into a number of series of shifted sub-images; and
(e) projectors for projecting each series of the shifted sub-images on the screen separately by one of the corresponding projectors, such that the images are displayed on the screen, and the display positions move on the screen according to a function of the velocity of the viewers.

12 Claims, 5 Drawing Sheets

SYSTEM FOR VISUALIZING IMAGES TO VIEWERS IN MOTION

BACKGROUND OF THE INVENTION

The invention relates to a new and improved system for visualizing one or more relatively still or animated images to one or more viewers in motion, especially for displaying traffic information or advertisements to the passengers on a train traveling in a subway tunnel.

The conventional principle of generating an animation is known. When a sequence of slightly different images are displayed rapidly one after another, a viewer perceives an animation. In a movie theater, the viewer sits still and the film frames move.

When a viewer is traveling by public transport, such as by train, the near view outside of the windows of the vehicle turns into a blur for the viewer because of the relative movement between the scene and the viewer. In order to display a sharp animated image in synchronism with a viewer in motion, a number of apparatuses and methods have been invented. Prior art includes a sequence of individual image frames mounted beside railway tracks, and a sequence of still images fixed or projected on the corresponding frames. The said still images differ slightly in sequence, such that when a viewer passes by the still images one after another, he perceives an animated image. This principle of creating an animation is just the inverse of the principle of conventional movies: the images are still but the viewer moves. Such prior art is represented by U.S. Pat. Nos. 742,632; 978,854; 2,913,954; 3,653,753; 3,694,062; 5,108,171; 6,016,183; 6,564,486 B1, etc.

However, the aforementioned prior art has the following limitations in application:

According to most of the prior art, when the image frames are set up, the interval between two adjacent frames must be predetermined with respect to a constant speed. If a vehicle speed is too slow compared to the constant speed, a viewer on the vehicle can only see a series of individual still images without animation effect. If a vehicle speed is too fast, the images turn into a blur to the viewer. In practice, when a train is slowing down to stop at or speeding up to leave from a train station, its speed is slow and not constant. In this situation, the known prior art cannot generate a continuous animation from a sequence of still images to the viewers on a moving train, although the sites in the neighborhood of train stations are crucial for displaying the traffic information and advertisements. Moreover, for most of the prior art, the still images are fixed on the frames, so it costs a lot of work and money to renew the images.

SUMMARY OF THE INVENTION

It is an object of the present invention to provide a new and improved system for visualizing one or more relatively still or animated images to one or more viewers in motion, especially for displaying traffic information or advertisements on a screen beside the railway tracks to the passengers on a train traveling in a tunnel.

This object is achieved by providing a system for visualizing one or more images to one or more viewers in motion, comprising:

(a) an extended span of screen;

(b) a sequence of projectors mounted along the said screen;

(c) means for receiving a series of at least one original images; and (d) means for dividing the frame of each image in the said series of original images into a number of sub-images and shifting the dividing lines on the frame of each image, frame by frame, according to a function of the moving velocity of the said viewers, such that the said series of original images are split into a number of series of shifted sub-images; and (e) means for projecting each series of said shifted sub-images on the said screen separately by one of the corresponding said projectors, such that one or more complete images are displayed on the said screen, and the display positions move on the said screen according to a function of the velocity of the said viewers.

As a viewer approaches the said screen, a sensor measures the position and velocity of the said viewer. In the meantime, each frame of original image is divided into a number of sub-images. For the next frame of original image, the dividing lines are shifted backward with respect to the measured velocity of the viewer. Thus the said series of original images are split into a number of series of shifted sub-images. Then each series of sub-images are separately projected on the said screen by one of the corresponding projectors. As a result, one or more complete images are displayed on the screen, and the display positions move forward in synchronism with the viewer. If each series of original images are substantially the same, the moving viewer perceives a relatively still image on the screen. If each series of original images are slightly different one after another, the moving viewer perceives an animated image on the screen.

According to another aspect of the invention, there is provided a system for visualizing one or more still or animated images to one or more viewers in motion, comprising:

(a) a sequence of adjacent monitors, such as LED or LCD;

(b) means for receiving a series of at least one original images; and (c) means for dividing the frame of each image in the said series of original images into a number of sub-images and shifting the dividing lines on the frame of each image, frame by frame, according to a function of the moving velocity of the said viewers, such that the said series of original images are split into a number of series of shifted sub-images; and (d) means for displaying each series of said shifted sub-images separately on one of the said sequence of electronic displaying panels, such that the corresponding adjacent displayed sub-images combine to one or more complete image and the display positions move on the said sequence of electronic displaying panels according to a function of the velocity of the said viewers.

Besides visualizing an animated image on a screen by a sequence of projectors, the present invention thus also makes it possible to visualize an animated image direct on a sequence of adjacent electronic displaying panels, such as LED or LCD, etc. By means of the present invention it is possible to display up-to-date traffic information by linking the apparatuses to the railway control network, and also possible to receive and display television programs with extra apparatuses such as a satellite dish.

Instead of using the techniques of the prior art, by which an animation is generated from a sequence of still images when a viewer passes by the still images one after another, the present invention uses the principle of conventional movies to generate an animated sub-image separately by each projector.

The present invention has the following advantages:

The generation of an animation effect is independent of the moving speed of the viewer, so it is possible to display an animated image to a viewer moving with an arbitrary velocity.

The projectors and monitors can display the images with a high frequency, e.g. 60 Hz or 60 frames per second, so the generated animation is more continuous and the display quality is much higher than those of prior art.

It is possible to display up-to-date traffic information or television programs.

It is easy and not costly to renew the display content.

BRIEF DESCRIPTION OF THE DRAWINGS

The present invention will now be described in greater detail with reference to one embodiment of the invention, given by the way of example only, in the annexed drawings in which.

DETAILED DESCRIPTION OF THE PREFERRED EMBODIMENTS

This invention relates to a new and improved system for visualizing one or more relatively still or animated images to one or more viewers in motion, especially for displaying traffic information or advertisements to the passengers on a train traveling in a tunnel. Instead of using the techniques of the prior art, by which an animation is generated from a sequence of still images as a viewer passes by the images one after another, the present invention uses the principle of conventional movies to generate an animated image and uses a new and improved method to make the display position of the animated image move on an extended span of screen in synchronism with a viewer in motion.

Figure 1:
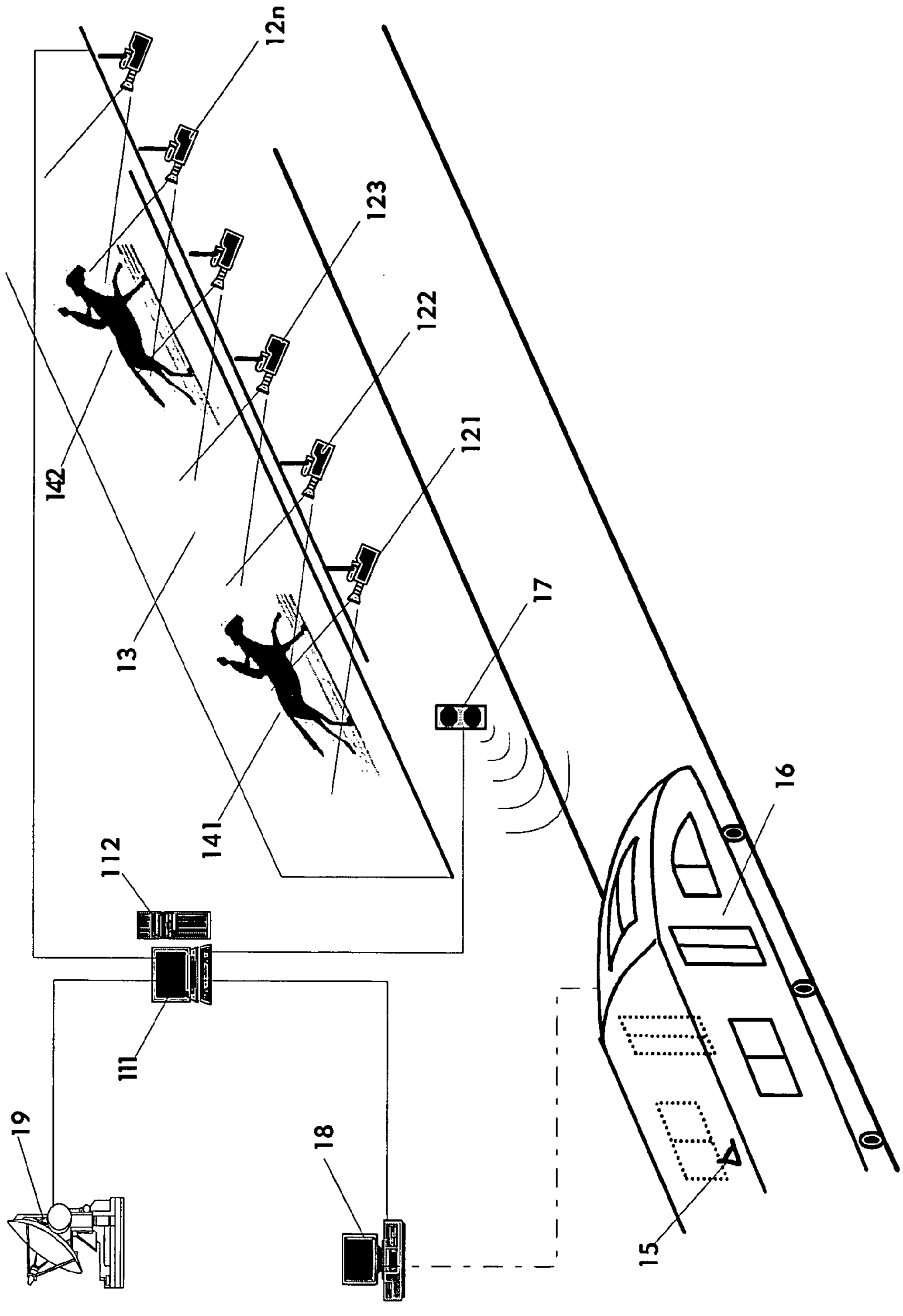
FIG. 1 is a schematic illustration of the apparatuses of an example of the present invention.

As an embodiment illustrated in FIG. 1, the apparatuses of the present invention comprise a center computer 111 with an image database 112. An extended span of screen 13 is mounted on a sidewall of a subway tunnel, and another screen could be mounted on another sidewall of the said tunnel if necessary. A sequence of projectors 121–12*n* are mounted on the ceiling of the tunnel along the screen 13, which are connected to the center computer 111. It is also possible to use a transparent screen and install the said projectors 121–12*n* behind the transparent screen. A sensor 17 is installed at one end of the screen 13 beside the rail tracks for detecting the position and the velocity of an approaching train. The sensor 17 is also connected to the center computer 111. The computer 111 could be connected to the center control station 18 of the railway network, such that it can receive up-to-date traffic information. The computer 111 could also be connected to a satellite dish 19 so that it can receive the television programs via satellite.

Figure 2:
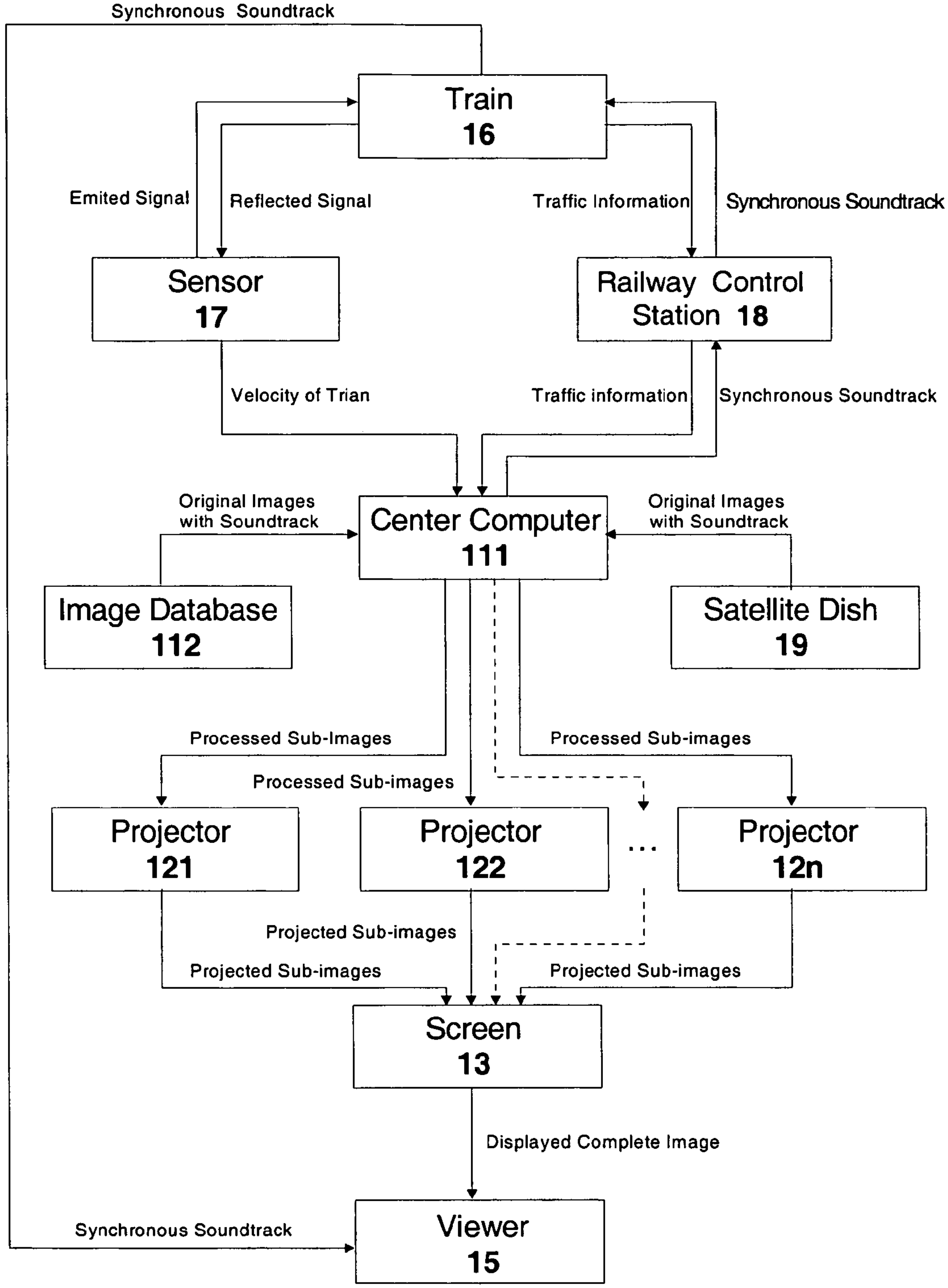
FIG. 2 is a block diagram showing the process, as an example, of visualizing a relatively still or animated image on a screen to the viewers in a moving vehicle.

FIG. 2 schematically shows the progress of processing, transforming and displaying images on a screen to the viewers in a moving vehicle. With reference to FIG. 2 and FIG. 1, the sensor 17, for instance, emits a radar signal or an infrared signal. When the sensor 17 receives a signal reflected by an approaching vehicle, e.g. train 16, the sensor 17 calculates the position and velocity of the train 16 and sends a message to the center computer 111. With the obtained message, the center computer 111 divides each original image into a number of sub-images and shifts the dividing lines on each frame of original image according to a function of the velocity of the train 16. The detailed description of the image processing method will be described later with reference to FIG. 3. Then, the computer 111 transmits the processed sub-images to the corresponding projectors 121–12*n*. Each projector 12*n* independently projects a corresponding series of sub-images on the screen 13. As a result, a sequence of complete images 141, 142, etc. are displayed on the screen 13, whose display positions are moving on the screen 13 in synchronism with the train 16. In the meantime, via the connection to the railway network, the center computer 111 sends the synchronous soundtrack to the train 16, such that the viewers on the train 16 can listen to the soundtrack corresponding to the displayed images via broadcast or headphone.

Figure 3:
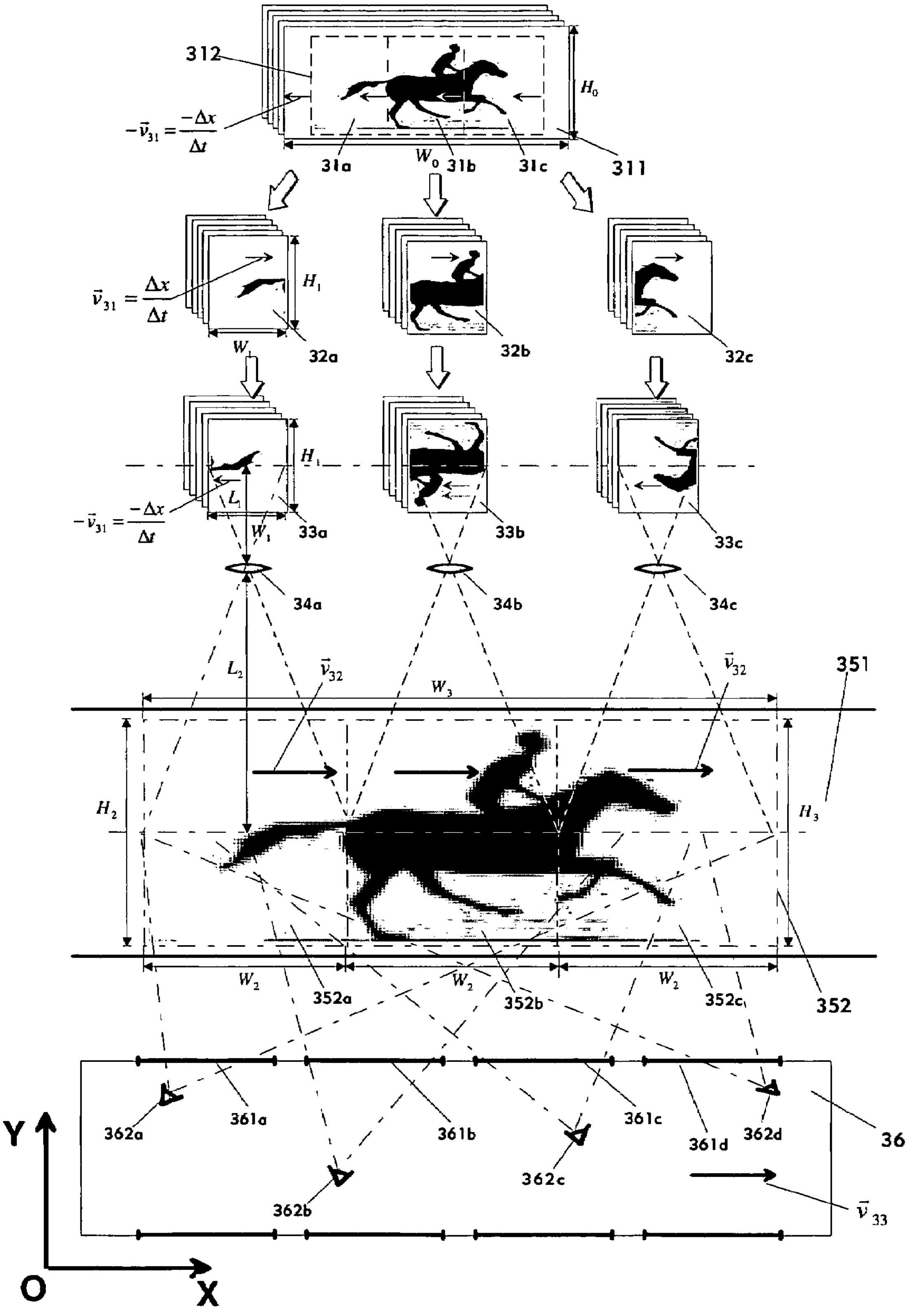
FIG. 3 is a schematic diagram of the geometry and optics of displaying an image moving in synchronism with the viewers in a traveling train carriage.

FIG. 3 schematically shows the geometry and optics, as an example of the present invention, for displaying an image on a screen moving in synchronism with viewers in a moving train carriage. There are four viewers 362*a*–362*d* located at the different positions of the train carriage 36, which is moving with a known velocity $\vec{V}_{33}$ relative to the fixed screen 351. A two-dimensional Cartesian coordinate system X-O-Y is made as shown in FIG. 3, wherein the x-direction is the same as the direction of $\vec{V}_{33}$ and y-direction is upwards. A series of original images 311, on which there is a racing horse with a rider on its back, have the same width of $W_0$ and height of $H_0$. The first frame in series 311 is divided into three sub-images 31*a*–31*c* with the same width of $W_1$ and height of $H_1$. For the next frame in series 311, the dividing lines 312 are shifted backward with a horizontal displacement $-\Delta x$ in the opposite direction of the train velocity $\vec{v}_{33}$. The absolute value of $-\Delta x$ will be determined later by the optical principles. If the display frequency of the projectors is $f_0$, then the time difference between the display instants of two adjacent frames is $\Delta t=1/f_0$. And the dividing lines 312 are shifted backward with a horizontal velocity $-\vec{v}_{31}=-\Delta x/\Delta t$ relative to the frame of images in series 311. On the other hand, it can be considered that the image objects on the sub-images 32*a*–*c* are shifted forward with a horizontal velocity $\vec{v}_{31}=\Delta x/\Delta t$ relative to the fixed frames of the sub-images 32*a*–*c*. Afterwards, each series of sub-images 32*a*–32*c* is transformed into series of sub-images 33*a*–33*c*. The sub-images 33*a*–33*c* have the same sizes but inverse directions as the sub-images 32*a*–32*c*. Then, each series of sub-images 33*a*–33*c* is separately projected on the screen 351 through the corresponding lenses 34*a*–34*c* of the projectors. As a result, the sub-images 352*a*–352*c* displayed on the screen 351 combine in a complete frame 352, and the position of the display frame 352 moves forward with a horizontal velocity $\vec{v}_{32}$ relative to the fixed screen 351. The width and height of the displayed sub-images 352*a*–352*c* as well as the velocity $\vec{v}_{31}$ and $\vec{v}_{32}$ satisfy the following equations, $$\begin{cases} \frac{1}{f} = \frac{1}{L_1} + \frac{1}{L_2}, & (1) \\ \frac{|\vec{v}_{31}|}{|\vec{v}_{32}|} = \frac{W_1}{W_2} = \frac{H_1}{H_2} = \frac{L_1}{L_2}, & (2) \end{cases}$$

where f is the focal length of the lenses 34*a*–34*c*, $L_1$ is the distance form the center horizontal axis of sub-images 33*a*–33*c* to the center of the lenses 34*a*–34*c*, $L_2$ is the distance form the center of the lenses 34*a*–34*c* to the center horizontal axis of the screen 351, $W_1$ and $H_1$ are the width and height of the sub-images 33*a*–33*c*, $W_2$ and $H_2$ are the width and height of the displayed sub-images 352*a*–352*c*. If the shifting velocity $\vec{v}_{32}$ of the display frame 352 equals the velocity $\vec{v}_{33}$ of the train 36, then the display frame 352 moves on the screen 351 in synchronism with the train 36.

If $\vec{v}_{33}$, $L_1$ and $L_2$ are known, let $\vec{v}_{32}=\vec{v}_{33}$, then the velocity $\vec{v}_{31}$ is determined as follows, $$\vec{v}_{31} = \frac{L_1}{L_2}\vec{v}_{32} = \frac{L_1}{L_2}\vec{v}_{33}. \quad (3)$$

Now the horizontal shifting displacement $-\Delta x$ of the dividing lines 312 between two adjacent frames in series 311 is calculated as $$-\Delta x = -\vec{v}_{31}\Delta t = -\frac{L_1}{L_2}\vec{v}_{33}\Delta t. \quad (4)$$

If a shifting displacement $-\Delta x'$ is not equal to $$-\Delta x = -\frac{L_1}{L_2}\vec{v}_{33}\Delta t,$$

for instance $$-\Delta x' = -\Delta x + \varepsilon(x, y) = -\frac{L_1}{L_2}\vec{v}_{33}\cdot\Delta t + \varepsilon(x, y), \quad (5)$$

where $\epsilon(x,y)$ is a scalar function and $|\epsilon(x,y)| \ll |-\Delta x|$, then the corresponding shifting velocity of the frames 311*a*–311*c* is $$-\vec{v}'_{31} = \frac{-\Delta x'}{\Delta t} = -\frac{L_1}{L_2}\vec{v}_{33} + \frac{\varepsilon(x, y)}{\Delta t}, \quad (6)$$

which has not only a horizontal velocity component, but also a vertical velocity component. As a result, the display frame 352 has a corresponding shifting velocity $\vec{v}'_{32}$ as follows, $$\begin{aligned} \vec{v}'_{32} &= \frac{L_2}{L_1}\vec{v}'_{31} \\ &= \frac{L_2}{L_1}\left(\frac{L_1}{L_2}\vec{v}_{33} - \frac{\varepsilon(x, y)}{\Delta t}\right) \\ &= \vec{v}_{33} - \frac{L_2}{L_1\Delta t}\varepsilon(x, y). \end{aligned} \quad (7)$$

The formula (7) shows that the display frame 352 has a small velocity difference $$-\frac{L_2}{L_1\Delta t}\varepsilon(x, y)$$

relative to the train 36. For the viewers 362*a*–263*d*, it seems that the train windows 361*a*–361*d* act as view windows roving on the display frame 352 with a relative velocity $$\frac{L_2}{L_1\Delta t}\varepsilon(x, y).$$

Selecting a suitable function $\epsilon(x,y)$, then all the viewers 362*a*–362*d* at the different positions of the train 36 can see the whole display frame 352 roving on the fixed screen 351 through the windows 361*a*–361*d*.

Figure 4:
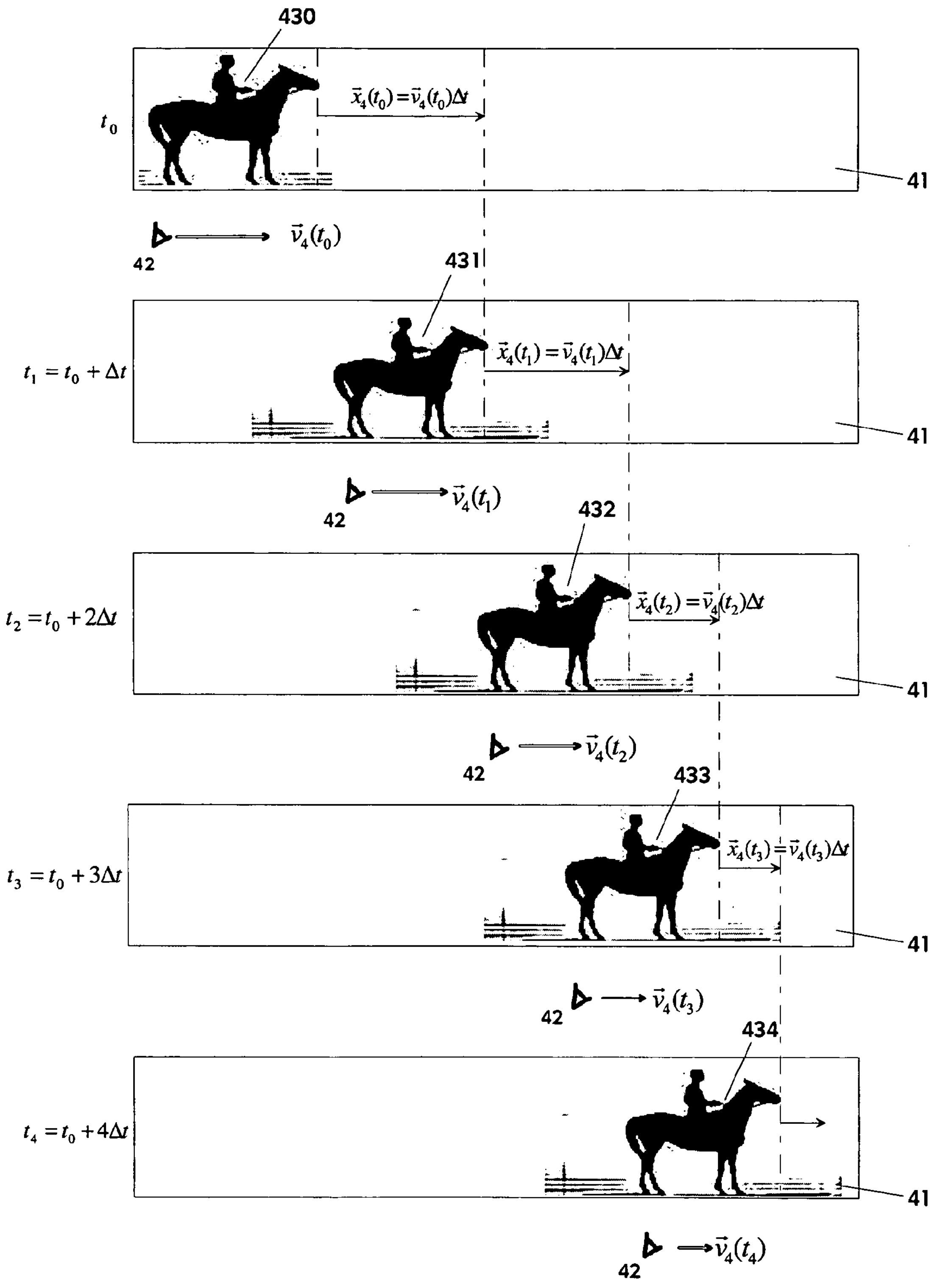
FIG. 4 is a schematic illustration of displaying a relative still image to a viewer in motion.

FIG. 4 schematically shows an example of displaying a series of relatively still images 43*n* on the screen 41 to a viewer 42 moving with a horizontal velocity $\vec{v}_4(t_n)$. The displayed images 431–43*n* are the same, except that each frame of image is shifted forward on the screen 41, frame by frame, according to the velocity $\vec{v}_4(t_n)$ of the viewer 42. The velocity $\vec{v}_4(t_n)$, chosen in this example, decreases in time, so that the shifting displacement $\vec{x}_4(t_n)=\vec{v}_4(t_n)\Delta t$ between two adjacent frames of images 43*n* and 43(n+1), as a function of $\vec{v}_4(t_n)$, also decreases in time. The display positions of image 431–43*n* move forward on the screen 41 in synchronism with the viewer 42, so the viewer 42 perceives a relatively still image 43*n* on the screen 41.

Figure 5:
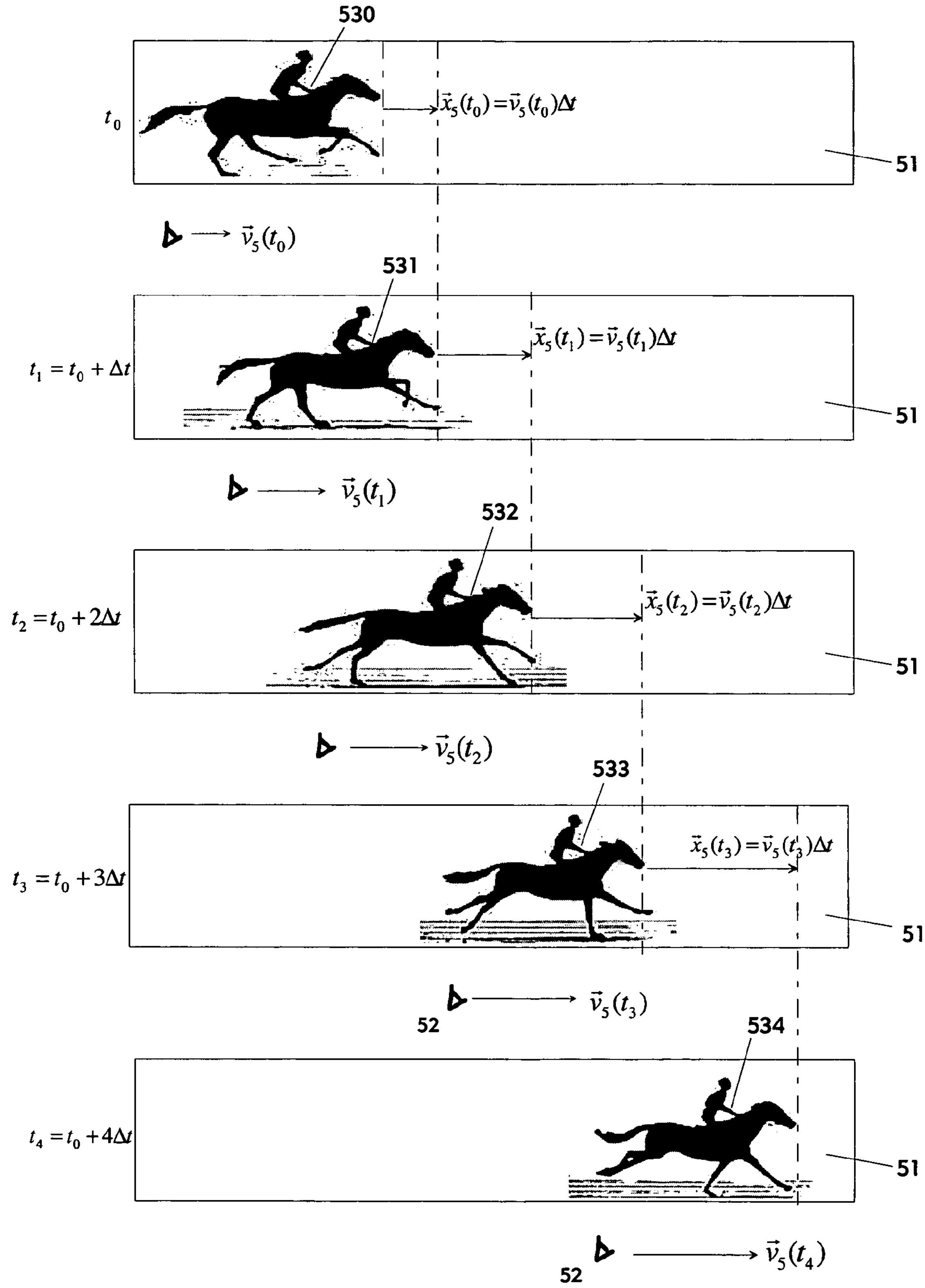
FIG. 5 is a schematic illustration of displaying an animated image to a viewer in motion.

FIG. 5 schematically shows an example of displaying a series of animated images 531–53*n* on the screen 51 to a viewer 52 moving with a horizontal velocity $\vec{v}_5(t_n)$. In this case, the velocity $\vec{v}_5(t_n)$ of the viewer 52 increases in time, and then the shifting displacement $\vec{x}_5(t_n)=\vec{v}_5(t_n)\Delta t$ between two adjacent frames of image 53*n* and 53(n+1) also increases in time. The images 531–53*n* differ slightly in sequence. When the images 531–53*n* are displayed on the screen 51 one after another and the display positions move forward on the screen 51 in synchronism with the viewer 52, then the viewer 52 perceives an animated image 53*n* on the screen 51.

The present invention uses the principle of conventional movies to display an animated sub-image on a screen separately by each projector, so the generation of animation effect is independent of the moving velocity of the viewer. Therefore, it is possible for the system of the present invention to display a continuously animated image to a viewer moving with an arbitrary velocity. Besides visualizing an animated image on a screen by a sequence of projectors, the present invention is also possible to visualize an animated image direct on a sequence of adjacent electronic displaying panels, such as LED or LCD, etc. Using the present invention, it is possible to display up-to-date traffic information by linking the apparatuses to the railway control network, and also possible to receive and display television programs with extra apparatuses such as a satellite dish.

The invention claimed is:

1. System for visualizing one or more images to one or more viewers in motion, comprising:

a) an extended span of screen;

b) a sequence of projectors mounted along said screen;

c) means for receiving a series of at least one original image(s); and d) means for dividing the frame of each image in the said series of original images into a number of sub-images and shifting the dividing lines on the frame of each image, frame by frame, according to a function of the moving velocity of the viewers, such that said series of original images are split into a number of series of shifted sub-images; and e) means for projecting each series of said shifted sub-images on said screen separately by one of the corresponding projectors, such that one or more complete images are displayed on the said screen, and the display positions move on said screen according to a function of the velocity of the viewers;

wherein said means for dividing are arranged such that said dividing lines are shifted backward in a horizontal direction with respect to the moving velocity of the viewers, such that the complete displayed images move forward on said screen synchronism with the moving viewers.

2. System according to claim 1 wherein said series of original images are substantially the same, such that one or more relatively still images are displayed on said screen moving in synchronism with the viewer.

3. System according to claim 1 wherein said series of original images differ slightly one after another, such that one or more animated images are displayed on said screen moving in synchronism with the viewer.

4. System according to claim 1, further comprising means for measuring the position and velocity of the viewers.

5. System for visualizing one or more images to one or more viewers in motion, comprising:

a) an extended span of screen;

b) a sequence of projectors mounted along said screen;

(c) means for receiving a series of at least one original image(s); and (d) means for dividing the frame of each image in said series of original images into a number of sub-images and shifting the dividing lines on the frame of each image, frame by frame, according to a function of the moving velocity of the viewers, such that said series of original images are split into a number of series of shifted sub-images;

e) means for projecting each series of said shifted sub-images on said screen separately by one of the corresponding projectors, such that one or more complete images are displayed on said screen, and the display positions move on said screen according to a function of the velocity of the viewers; wherein said means for dividing are arranged to shift said dividing lines in both a horizontal direction and a vertical direction with respect to the moving velocity of the viewers, such that said complete displayed images move on the said screen in both said horizontal and vertical directions, and the horizontal component of the velocity of the complete displayed images is in synchronism with the moving viewers.

6. System for visualizing one or more still or animated images to one or more viewers in motion, comprising:

(a) a sequence of adjacent monitors, such as LED or LCD;

(b) means for receiving a series of at least one original image(s); and (c) means for dividing the frame of each image in said series of original images into a number of sub-images and shifting the dividing lines on the frame of each image, frame by frame, according to a function of the moving velocity of the viewers, such that said series of original images are split into a number of series of shifted sub-images; and means for displaying each series of said shifted sub-images separately on one of said sequence of electronic displaying panels, such that the corresponding adjacent displayed sub-images combine to create one or more complete images and the display positions move said sequence of electronic displaying panels according to a function of the velocity of the viewers; and wherein said means for dividing are arranged such that said dividing lines are shifted backward in horizontal direction with respect to the moving velocity of the viewers, such that the complete displayed images move forward on said screen in synchronism with the moving viewers.

7. System according to claim 6 wherein said series of original images are substantially the same, such that one or more relatively still images are displayed on said screen moving in synchronism with the viewers.

8. System according to claim 6 wherein said series of original images differ slightly one after another, such that one or more animated images are displayed on said screen moving in synchronism with the viewers.

9. System according to claim 6, further comprising means for measuring the position and velocity of the viewers.

10. System for visualizing one or more still or animated images to one or more viewers in motion, comprising:

(a) a sequence of adjacent monitors, such as LED or LCD;

(b) means for receiving a series of at least one original image(s); and (c) means for dividing the frame of each image in said series of original images into a number of sub-images and shifting the dividing lines on the frame of each image, frame by frame, according to a function of the moving velocity of the viewers, such that the series of original images are split into a number of series of shifted sub-images; and means for displaying each series of said shifted sub-images separately on one of the said sequence of electronic displaying panels, such that the corresponding adjacent displayed sub-images combine to create one or more complete images and the display positions move said sequence of electronic displaying panels according to a function of the velocity of the viewers arranged to shift the dividing lines in both a horizontal direction and a vertical direction with respect to the moving velocity of the viewers, such that the complete displayed images move on the said screen in both said horizontal and vertical directions, and the horizontal component of the velocity of the complete displayed images is in synchronism with the moving viewers.

11. System for visualizing one or more images to one or more viewers in motion, comprising:

a) an extended span of screen;

b) a sequence of projectors mounted along said screen;

c) means for receiving a series of at least one original image; and d) means for dividing the frame of each image in said series of original images into a number of sub-images and shifting the dividing lines on the frame of each image, frame by frame, according to a function of the moving velocity of the viewers, such that said series of original images are split into a number of series of shifted sub-images; and e) means for projecting each series of said shifted sub-images on said screen separately by one of the corresponding projectors, such that one or more complete images are displayed on said screen, and the display positions move on said screen according to a function of the velocity of the viewers;

and wherein said means for receiving, said means for dividing and said means for projecting are disposed each with respect to one another such that generation of an animation effect created by said series of original images and the perception of said effect by the viewer are independent of the moving speed of the viewer.

12. System for visualizing one or more still or animated images to one or more viewers in motion, comprising:

(a) a sequence of adjacent monitors, such as LED or LCD;

(b) means for receiving a series of at least one original image; and (c) means for dividing the frame of each image in said series of original images into a number of sub-images and shifting the dividing lines on the frame of each image, frame by frame, according to a function of the moving velocity of the viewers, such that said series of original images are split into a number of series of shifted sub-images; and means for displaying each series of said shifted sub-images separately on one of said sequence of electronic displaying panels, such that the corresponding adjacent displayed sub-images combine to create one or more complete images and the display positions move on said sequence of electronic displaying panels according to a function of the velocity of the viewers; and wherein said means for receiving, said means for dividing and said means for projecting are disposed each with respect to one another such that generation of an animation effect created by said series of original images and the perception of said effect by the viewer are independent of the moving speed of the viewer.

* * * * *